US012325080B2

(12) United States Patent
Bassindale et al.

(10) Patent No.: US 12,325,080 B2
(45) Date of Patent: Jun. 10, 2025

(54) BAND SAW

(71) Applicant: MILWAUKEE ELECTRIC TOOL CORPORATION, Brookfield, WI (US)

(72) Inventors: Wesley S. Bassindale, Wauwatosa, WI (US); Jonathan E. Schmitz, Wauwatosa, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 2 days.

(21) Appl. No.: 18/167,940

(22) Filed: Feb. 13, 2023

(65) Prior Publication Data
US 2023/0256527 A1 Aug. 17, 2023

Related U.S. Application Data

(60) Provisional application No. 63/309,716, filed on Feb. 14, 2022.

(51) Int. Cl.
*B23D 53/12* (2006.01)
*B23D 55/06* (2006.01)
(52) U.S. Cl.
CPC ........... *B23D 53/12* (2013.01); *B23D 55/065* (2013.01)
(58) Field of Classification Search
CPC ...... B23D 53/12; B23D 55/065; B23D 55/06; B23D 55/082; B23D 55/10; B23D 59/007;
(Continued)

(56) References Cited

U.S. PATENT DOCUMENTS 1,453,335 A * 5/1923 Bennett ................... B23D 53/12
83/820
3,830,131 A * 8/1974 Wells ................... B23D 55/082
83/820
(Continued)

FOREIGN PATENT DOCUMENTS

CN 2885473 Y 4/2007
CN 201235421 Y 5/2009
(Continued)

OTHER PUBLICATIONS

Fix.com, "DeWalt Band Saw Repair—How to Replace the Drive Pulley," <https://www.youtube.com/watch?v=gfmFulmO2Wk> video published to YouTube on Dec. 27, 2018 (2 pages).

*Primary Examiner* — Ghassem Alie
(74) *Attorney, Agent, or Firm* — Michael Best & Friedrich LLP

(57) ABSTRACT

A band saw including a housing, a motor, a drive pulley configured to receive torque from the motor, and a plurality of driven pulleys rotatably coupled to a plate, in which the plate is coupled to the housing for sliding movement. The band saw further includes a cavity within the housing and located between the drive pulley and the plurality of driven pulleys and an endless saw blade wrapped around the drive pulley and the plurality of driven pulleys. A first of the driven pulleys is rotatable about a first axis oriented perpendicular to the plate. A second of the driven pulleys is rotatable about a second axis that is obliquely oriented relative to the plate to impart a twisting movement to the saw blade about an oblong path defined by the saw blade, prior to the saw blade passing through the cavity.

14 Claims, 7 Drawing Sheets

(58) Field of Classification Search
CPC ... B23D 55/00; B23D 59/001; Y10T 83/7245; Y10T 83/7264
USPC ......... 83/380, 801, 785, 814, 812, 813, 815, 83/816, 818, 820, 574; 30/380; 474/18, 474/29
See application file for complete search history.

(56) References Cited

U.S. PATENT DOCUMENTS

| | | | |
|---|---|---|---|
| 3,913,436 A * | 10/1975 | Orescan | B26D 1/46 83/788 |
| 4,001,937 A | 1/1977 | Stelljes et al. | |
| 4,193,192 A * | 3/1980 | Cortez | B23D 53/12 83/820 |
| 7,276,003 B2 | 10/2007 | Liao | |
| 10,576,560 B2 | 3/2020 | Shiel | |
| 2008/0282556 A1* | 11/2008 | McIntosh | B23D 53/12 29/592 |
| 2010/0018064 A1* | 1/2010 | Bertsch | B23D 53/12 30/371 |
| 2020/0017158 A1 | 6/2020 | Rabinowitz | |

FOREIGN PATENT DOCUMENTS

| | | |
|---|---|---|
| CN | 101642835 A | 2/2010 |
| CN | 202291646 U | 7/2012 |
| DE | 3325211 A1 | 1/1985 |

* cited by examiner

BAND SAW

CROSS-REFERENCE TO RELATED APPLICATIONS

This application claims priority to U.S. Provisional Patent Application No. 63/309,716 filed on Feb. 14, 2022, the entire content of which is incorporated herein by reference.

FIELD OF THE INVENTION

The present invention relates to power tools, and, more particularly, to band saws.

BACKGROUND OF THE INVENTION

Band saws are generally used for various cutting operations, such as for cutting pipe, conduit, and a variety of other materials. Band saws generally include a powered, drive pulley and a non-powered, driven pulley that are connected by a continuous saw blade. The saw blade, in turn, transfers torque to the driven pulley, causing it to rotate with the drive pulley during a cutting operation.

SUMMARY OF THE INVENTION

The present invention provides, in one aspect, a band saw including a housing, a motor supported by the housing, a drive pulley configured to receive torque from the motor, causing the drive pulley to rotate, and a plurality of driven pulleys rotatably coupled to a plate, in which the plate is coupled to the housing for sliding movement. The band saw further includes a cavity within the housing and located between the drive pulley and the plurality of driven pulleys, and an endless saw blade wrapped around the drive pulley and the plurality of driven pulleys. The endless saw blade passes through the cavity and is configured to be driven by the drive pulley. Additionally, the saw blade defines an oblong path around the drive pulley and the driven pulleys. A first of the driven pulleys is rotatable about a first axis oriented perpendicular to the plate. A second of the driven pulleys is rotatable about a second axis that is obliquely oriented relative to the plate to impart a twisting movement to the saw blade about the oblong path prior to the saw blade passing through the cavity.

The present invention provides, in another aspect, a band saw including a housing, a motor supported by the housing, a drive pulley configured to receive torque from the motor, causing the drive pulley to rotate, a plurality of driven pulleys, a cavity within the housing and located between the drive pulley and the plurality of driven pulleys, and an endless saw blade wrapped around the drive pulley and the plurality of driven pulleys. The endless saw blade passes through the cavity and is configured to be driven by the drive pulley, the saw blade defining an oblong path around the drive pulley and the driven pulleys. A first rotational axis of a first of the driven pulleys is non-parallel to a second rotational axis of a second of the driven pulleys. At least one of the first and second driven pulleys is configured to impart a twisting movement to the saw blade about the oblong path prior to the saw blade passing through the cavity.

The present invention provides, in another aspect, a band saw including a housing, a motor supported by the housing, a drive pulley configured to receive torque from the motor, causing the drive pulley to rotate, and a plurality of driven pulleys rotatably coupled to a plate. Each driven pulley is rotatably supported to the plate by a support shaft. The band saw further includes a cavity within the housing and located between the drive pulley and the plurality of driven pulleys and an endless saw blade wrapped around the drive pulley and the plurality of driven pulleys. The endless saw blade passing through the cavity and configured to be driven by the drive pulley. The saw blade defining an oblong path around the drive pulley and the driven pulleys. A first of the support shafts supporting a first of the driven pulleys defines a first rotational axis oriented perpendicular to the plate. A second of the support shafts supporting a second of the driven pulleys defines a second rotational axis obliquely oriented relative to the plate such that the second driven pulley imparts a twisting movement to the saw blade about the oblong path prior to the saw blade passing through the cavity.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
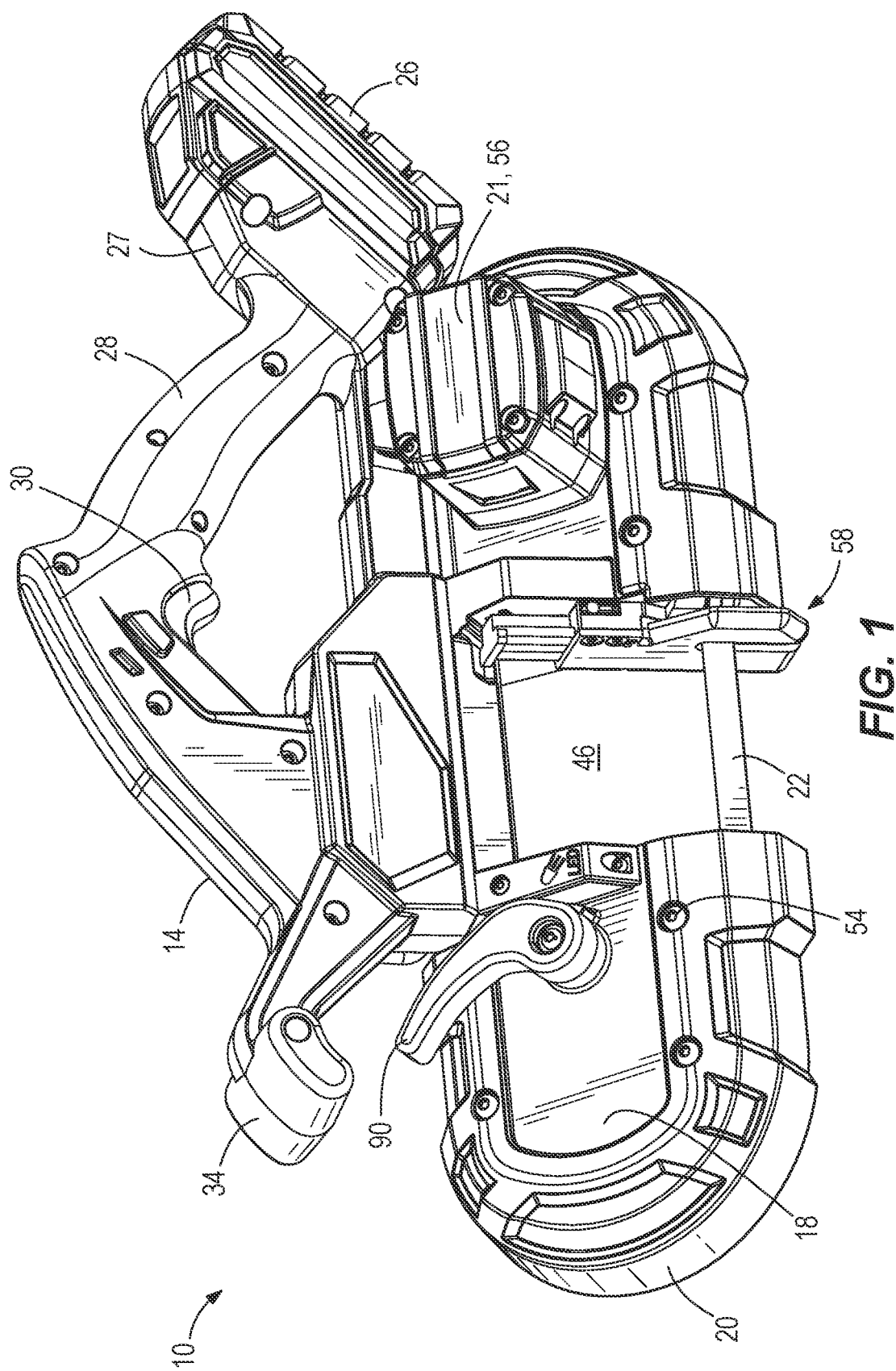
FIG. 1 is a front perspective view of a band saw according to an embodiment of the present invention.
Figure 2:
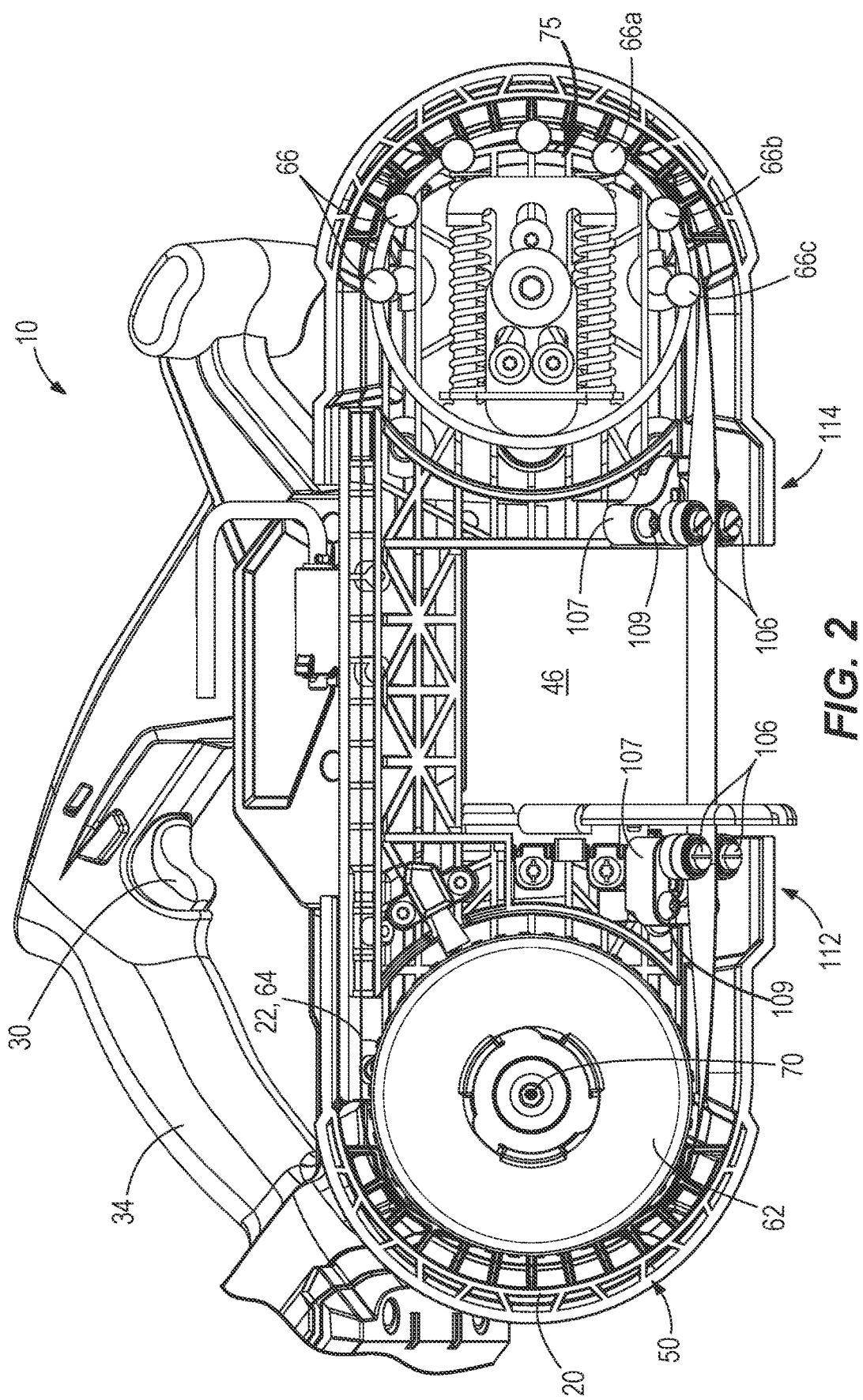
FIG. 2 is a side view of the band saw of FIG. 1, illustrating a drive pulley and plurality of driven pulleys.

FIGS. 1 and 2 illustrate a band saw 10 including a housing 14 having a deck 18 and a guard 20 coupled to the deck 18. The deck 18 supports a motor 21 and, in some embodiments, a gear train (not shown). The gear train may take any of a number of different arrangements configured to convert the relatively high-speed, low-torque input provided by the motor 21 to a relatively low-speed, high-torque output. The motor 21 is operable to drive a continuous band saw blade 22 to cut a work piece. The motor 21 is configured as a brushless DC motor, in which a battery pack 26 is utilized to provide power to the brushless DC motor. Such a battery pack 26 may be configured having any of a number of different voltages (e.g., 12, 14.4, 18, 24, 28 volts, etc.). Such a battery pack 26 may also be configured having any of a number of different chemistries (e.g., Lithium-ion, Nickel Cadmium, Nickel Metal-Hydride, etc.). The battery pack 26 is configured to be received within a battery receptacle 27.

With continued reference to FIGS. 1 and 2, the band saw 10 includes a primary handle 28 supporting the battery pack 26 and a switch assembly 30 configured to operate the band saw 10. The switch assembly 30 is operable to control operation of the motor 21. The band saw 10 also includes an auxiliary handle 34 for a user's other hand. Generally, the handles 28, 34 are shaped and arranged for two-handed operation of the band saw 10 as the work piece is cut. In the illustrated embodiment of the band saw 10, each handle 28, 34 has an ergonomic design to provide comfortable gripping and controlled operation of the band saw 10. The ergonomic design of each handle 28, 34 may result from the orientation or angle of one or more of the handles 28, 34. The ergonomic design may also result from the use of material, such as an elastomeric material, on one or more of the handles 28, 34 to provide an improved grip surface, isolate vibration and impacts from the operator, prevent heat build-up and/or heat transfer to the operator, etc.

A combination of the deck 18 and the guard 20 defines a cavity 46 in which a work piece is received during a cutting operation. While the saw blade 22 is exposed across a length of the cavity 46, the guard 20 provides a recessed area 50 in which a substantial portion of the band saw blade 22 is positioned (FIG. 2). In the illustrated embodiment of the band saw 10, the guard 20 is formed as a separate piece from the deck 18 and is removably coupled to the deck 18 (e.g., using fasteners 54; see FIG. 1). The guard 20 is made of a hard plastic or polymer material and is positioned around a perimeter of the deck 18 to protect the perimeter of the deck 18 from bumps and scratches that occur during use. Alternatively, the deck 18 and the guard 20 may be integrally formed as a single piece. The deck 18 includes a motor housing portion 56 that encloses the motor 21 and, if used, the gear train. The band saw 10 also includes a shoe 58 coupled to the housing 14 and having a support surface against which a work piece is abutted during a cutting operation.

With reference to FIG. 2, the band saw 10 includes a first guide roller set 112 disposed on one side of the cavity 46 and a second guide roller set 114 disposed on an opposite side of the cavity 46. Each of the guide roller sets 112, 114 includes aligned rollers 106 with which opposite sides of the saw blade 22 are engaged and a mounting block 107 to which the rollers 106 are rotatably supported. The mounting blocks 107 are coupled to the deck 18 using fasteners (e.g., bolts or screws 109). The first and second guide roller sets 112, 114 support the band saw blade 22 as the blade 22 moves across the cavity 46.

Figure 3:
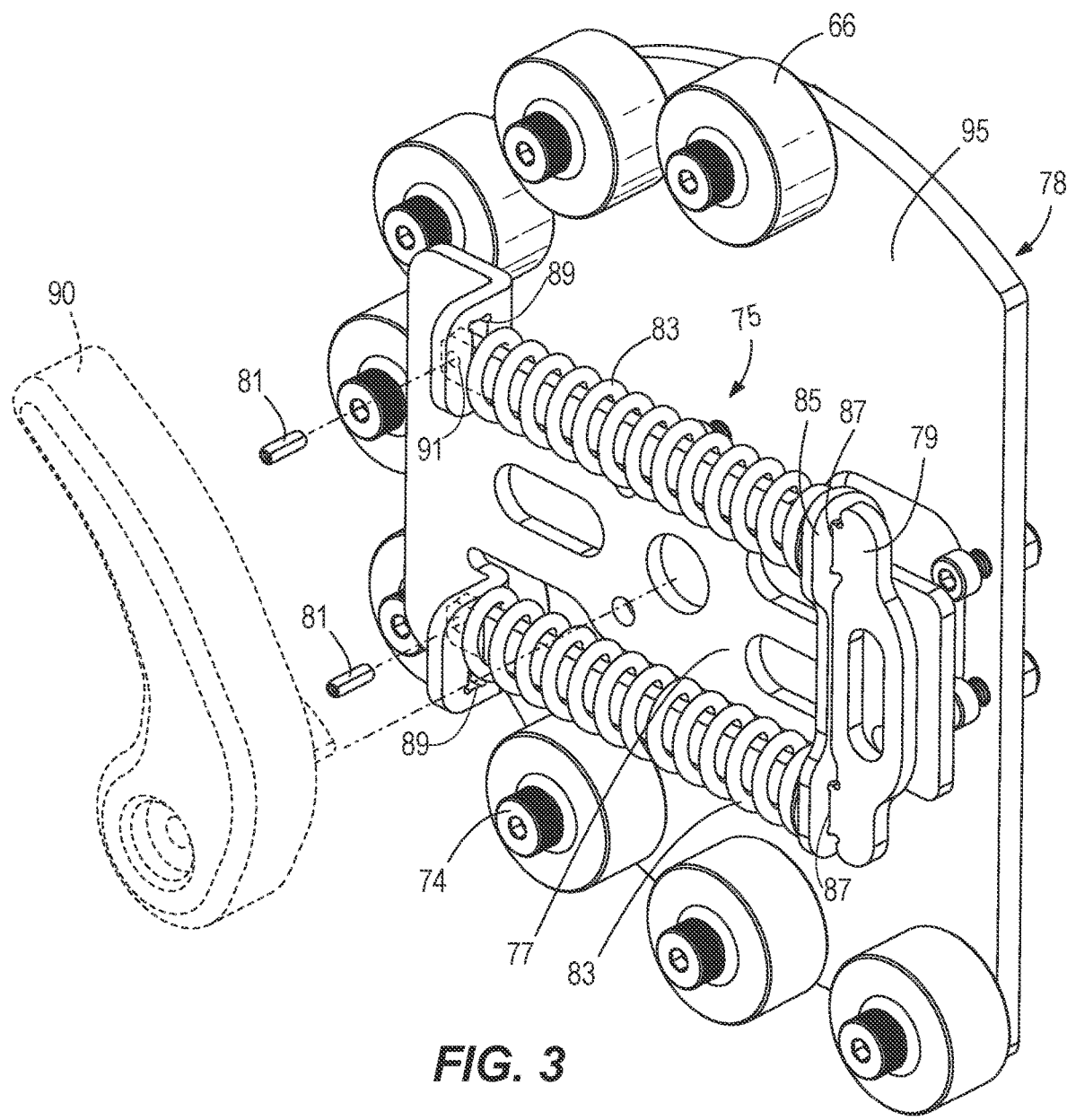
FIG. 3 is a side perspective view of a driven pulley assembly, illustrating the plurality of driven pulleys of FIG. 2 coupled to a plate and a tensioning assembly.
Figure 4:
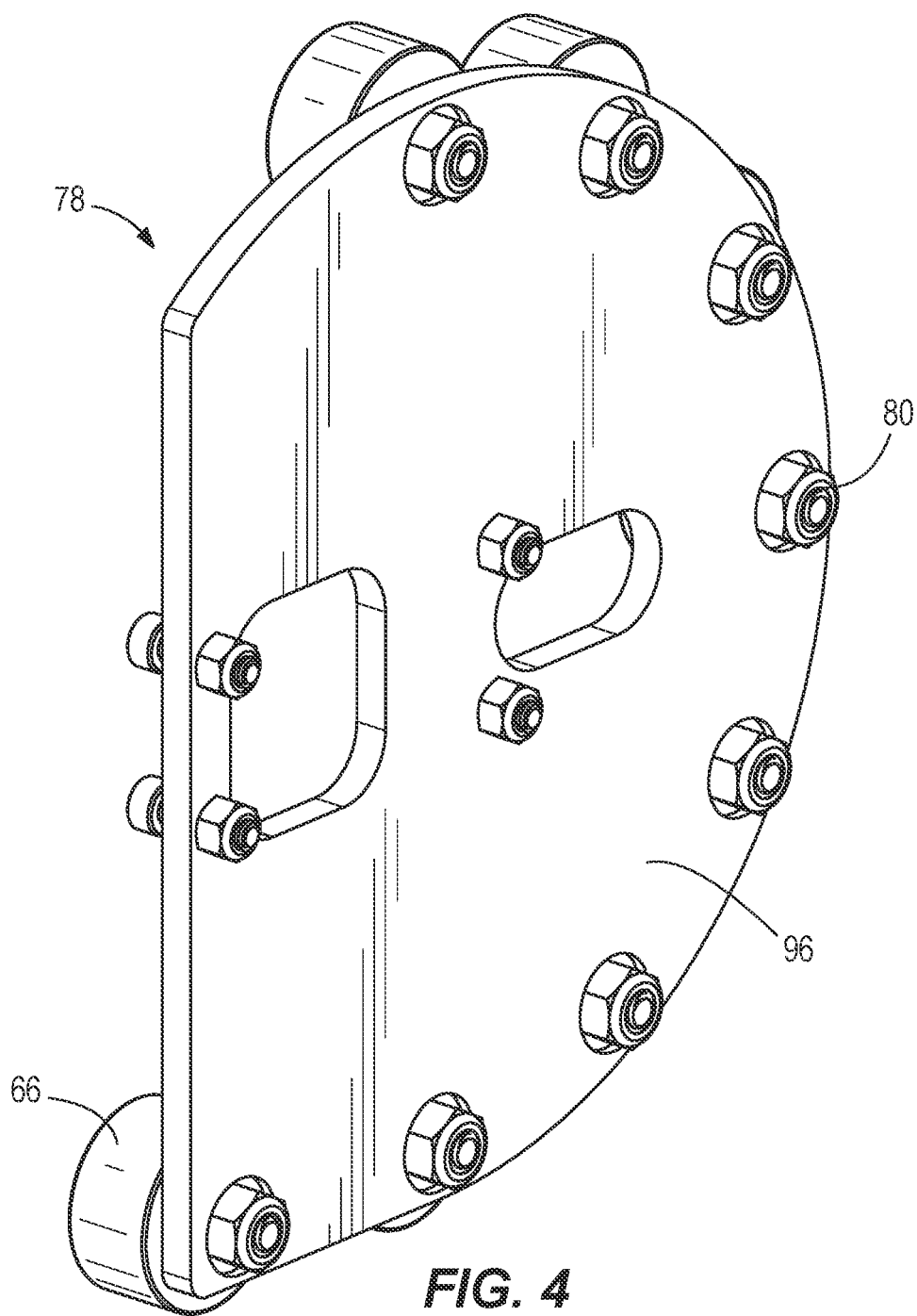
FIG. 4 is an opposite side perspective view of the driven pulley assembly of FIG. 3.

With reference to FIGS. 2-4, the band saw 10 includes a drive pulley 62 and a plurality of driven pulleys 66. The outer peripheral surface and an interior side of each of the drive pulley 62 and the plurality of driven pulleys 66 are covered by the deck 18 and the guard 20. The drive pulley 62 rotates about a drive pulley axis 70 defined by a drive pulley spindle (not shown). The drive pulley spindle is rotationally supported by the gear train. The drive pulley 62 is drivingly connected to the motor 21 via the gear train and the drive pulley spindle. In some embodiments, the gear train is located between the motor 21 and the drive pulley 62. In other embodiments, the motor 21 may directly drive the drive pulley 62 without an intervening gear train. Each of the driven pulleys 66 rotates about a shaft 74 configured to rotatably couple each driven pulley 66 to a plate 78 which, in turn, is coupled to the housing 14. In some embodiments, the distance of the plate 78 relative to the drive pulley axis 70 is adjustable to adjust the tension applied to the saw blade 22. The band saw blade 22 extends around the drive pulley 62 and the plurality of driven pulleys 66, defining an oblong path 64. As a result, motion from the drive pulley 62 is transmitted to the band saw blade 22.

The band saw 10 also includes a blade tensioning assembly 75 having a blade tensioning lever 90 coupled to the deck 18 to adjust the amount of tension applied to the band saw blade 22. The blade tensioning assembly 75 further includes a tensioning plate 77, a tensioning bracket 79, a pair of pins 81, a pair of springs 83, and a contact plate 85. At a first end of the blade tensioning assembly 75, the tensioning plate 77 and the tensioning bracket 79 are coupled together by the contact plate 85. The contact plate 85 includes a pair of bracket apertures 87 configured to receive the tensioning bracket 79 and a plate aperture (not shown) configured to receive the tensioning plate 77. At a second end of the blade tensioning assembly 75, the tensioning bracket 79 extends through a pair of apertures 89 formed in the tensioning plate 77. The pair of pins 81, specifically coil pins, are inserted into a pair of pin holes 91 formed in the tensioning bracket 79, to further secure the tensioning bracket 79 to the tensioning plate 77. As such, the tensioning bracket 79 is affixed to the housing 14, and therefore is stationary. The tensioning plate 77 and the plate 78 are configured to move in a front direction and a rear direction to increase or decrease the tension in the band saw blade 22 as the lever 90 is adjusted by a user. The tensioning plate 77 is coupled to the plate 78 via fasteners (not shown), such that the tensioning plate 77 and the plate 78 are configured to move in unison as the lever 90 is operated. When the springs 83 rebound, the springs 83 apply tension to the band saw blade 22. As the spring 83 are compressed, the tension in the band saw blade 22 is released so that the saw blade 22 can be removed or replaced from the band saw 10.

Figure 6:
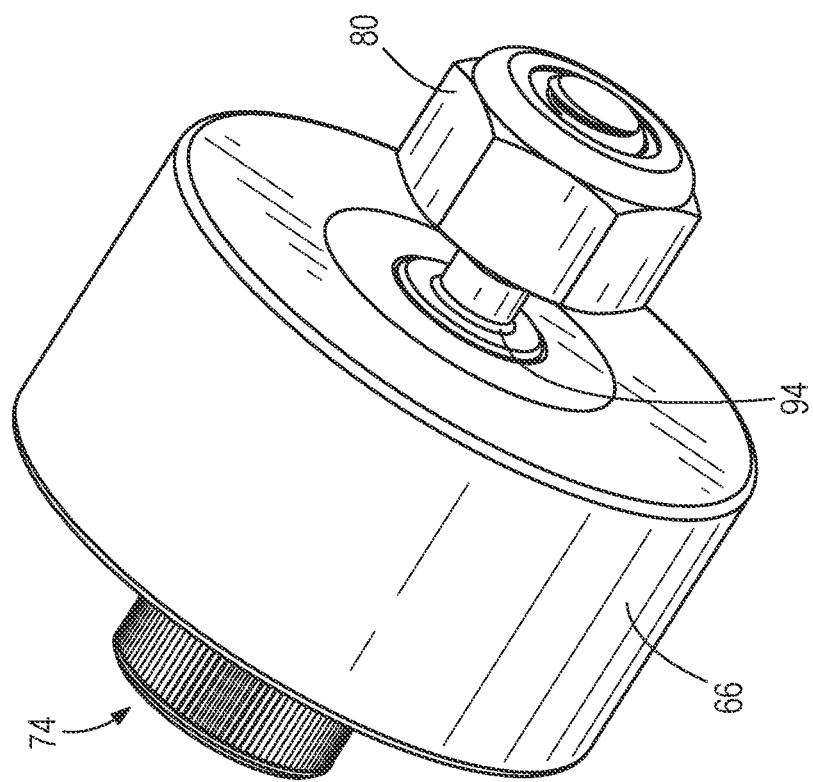
FIG. 6 is a rear perspective view of the driven pulley of FIG. 5.
Figure 5:
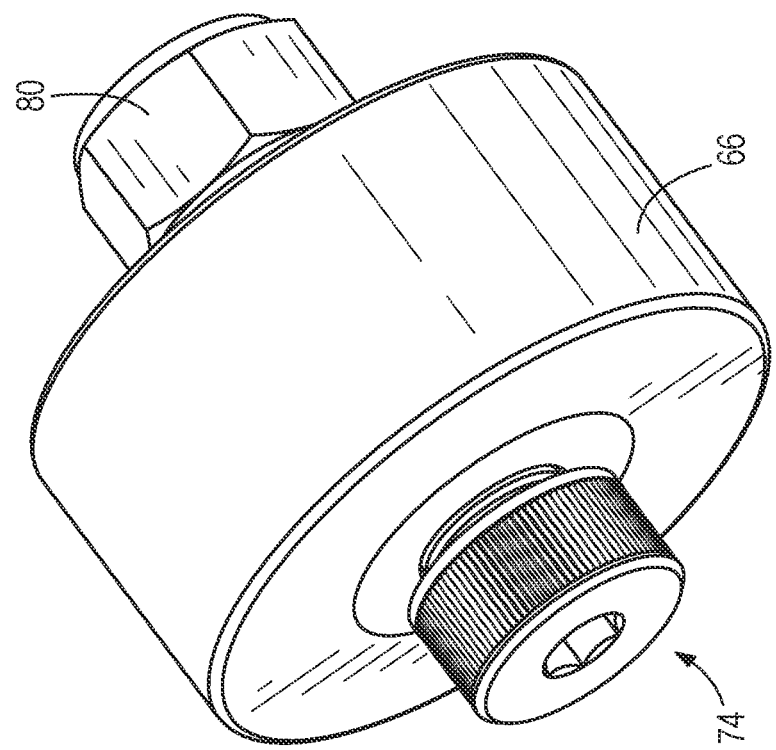
FIG. 5 is a front perspective view of a single driven pulley coupled to a shaft.
Figure 7:
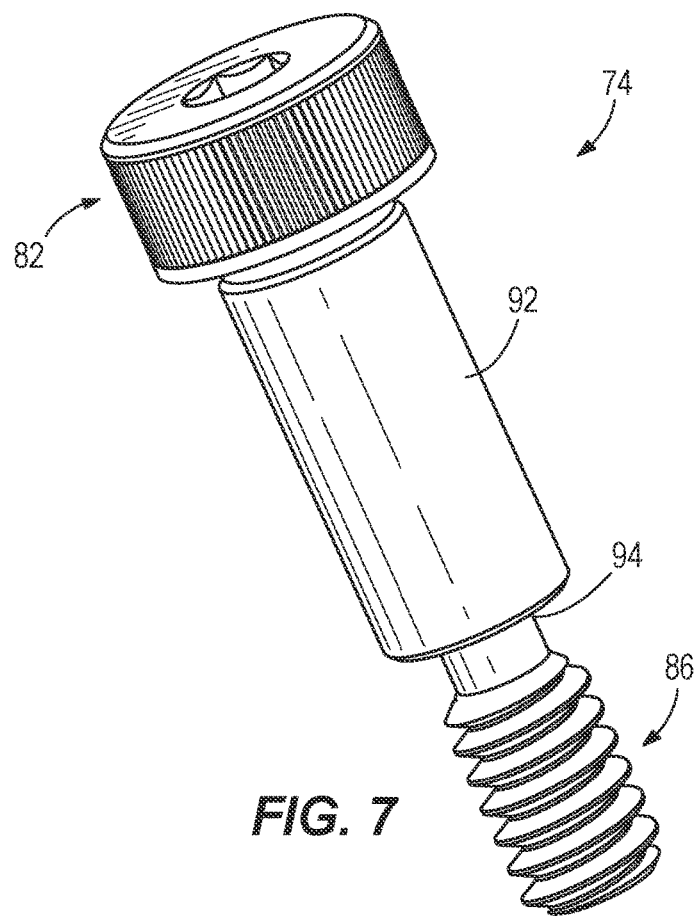
FIG. 7 is a perspective view of the shaft of FIG. 5.
Figure 8A:
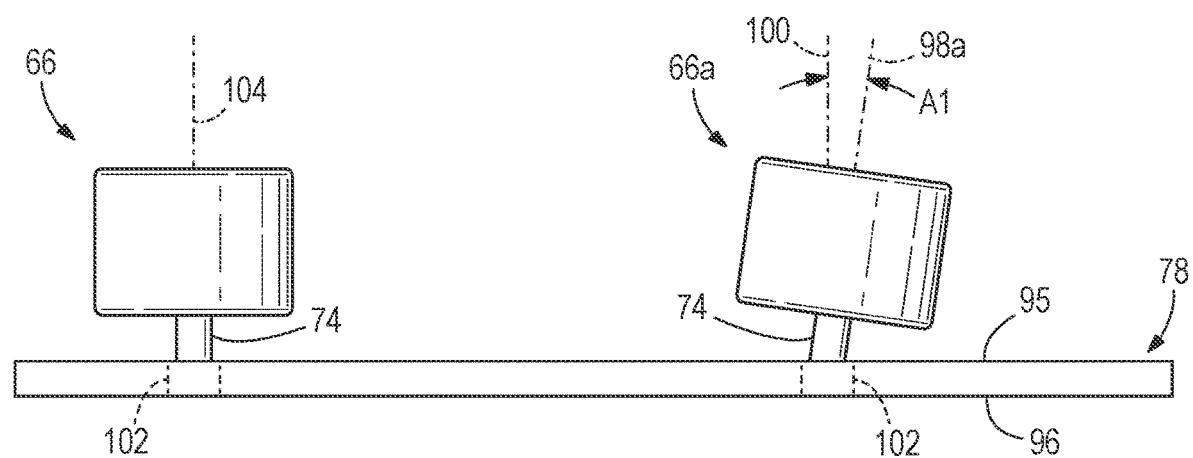
FIG. 8A is a schematic side view of the driven pulley assembly of FIG. 3, illustrating a first of the driven pulleys oriented at an oblique angle relative to the plate.
Figure 8B:
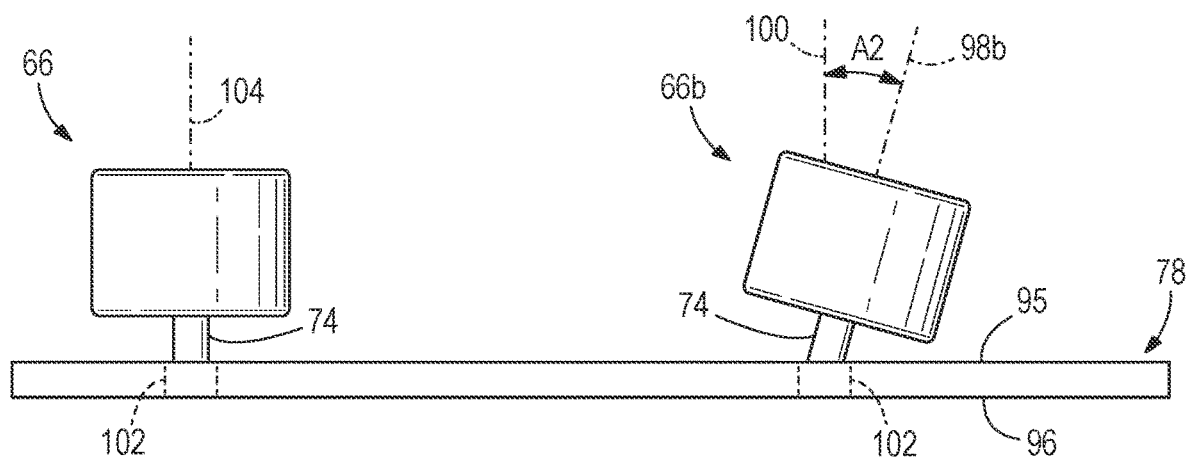
FIG. 8B is a schematic side view of the driven pulley assembly of FIG. 3, illustrating a second of the driven pulleys oriented at an oblique angle relative to the plate.
Figure 8C:
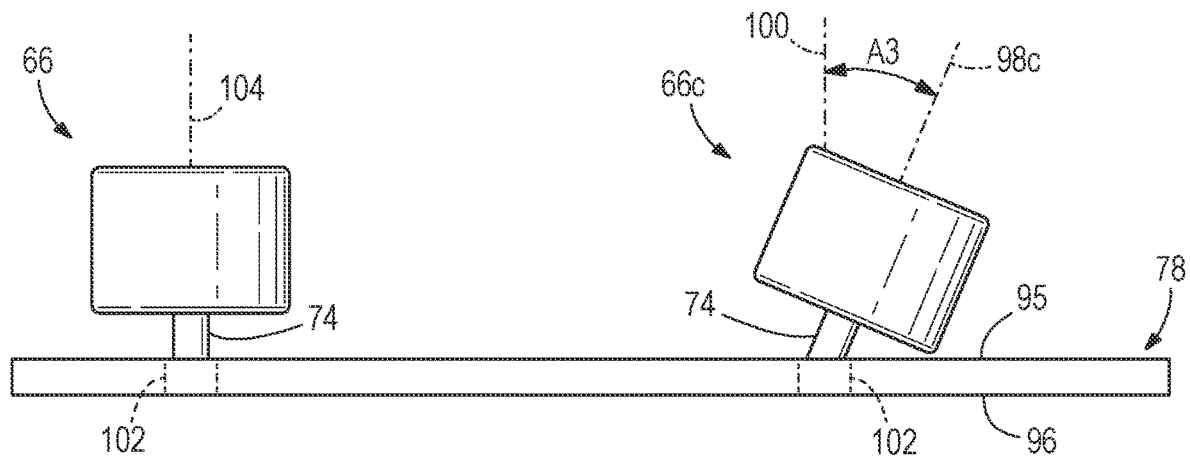
FIG. 8C is a schematic side view of the driven pulley assembly of FIG. 3, illustrating a third of the driven pulleys oriented at an oblique angle relative to the plate.

With reference to FIGS. 5-7, the shafts 74 of each driven pulley 66 are configured as a shoulder bolt including a first end or head 82, a second or threaded end 86 opposite the head 82, and an unthreaded, cylindrical shank 92 between the head 82 and the threaded end 86. The shafts 74 also include a shoulder 94 adjacent the shank 92 that is seated against a front side 95 of the plate 78 (FIG. 3). A nut 80 is threaded to the threaded end 86 and is seated against a rear side 96 of the plate 78 (FIG. 3), thereby clamping the plate 78 between the shoulder 94 and the nut 80. The threaded end 86 is configured to be at least partially received within a hole 102 (FIGS. 8A-8C) in the plate 78, with the threaded end 86 protruding through the hole 102 to receive the nut 80. The holes 102 may be unthreaded or threaded, in which the case the threads in the holes 102 would have a corresponding pitch as the threaded end 86.

With reference to FIGS. 2 and 8A-8C, the driven pulleys 66 are mounted on the plate 78 in a manner to gradually impart a twisting movement on the saw blade 22, over multiple of the driven pulleys 66, along the oblong path 64 leading to the cavity 46. Most of the driven pulleys 66 are rotatable about an axis 104 that is defined by the shaft 74 and oriented perpendicular to the plate 78 (e.g., driven pulleys 66 in FIGS. 8A-8C). However, several of the driven pulleys 66a-66c are mounted to the plate 78 such that the rotational axes 98a-98c of the respective driven pulleys 66a-66c are obliquely oriented relative to the plate 78 to define an inclination angle A measured relative to a normal 100 extending from the plate 78. The driven pulleys 66 are capable of having an inclination angle A that ranges from 0 degrees to 45 degrees to facilitate various twisting movements on the saw blade 22 along the oblong path 64.

Preferably, the inclination angle A of each driven pulley 66a-66c gradually increases along the oblong path 64, traveling towards the cavity 46. The inclination angle A is at a maximum value proximate the cavity 46. In the illustrated embodiment of FIGS. 2 and 8A-8C, the rotational axis 98a of a first driven pulley 66a is oriented at an inclination angle A1 of 15 degrees, the rotational axis 98b of a second driven pulley 66b positioned at an inclination angle A2 of 30 degrees, and the rotational axis 98c of a third driven pulley 66c having an inclination angle A3 of 45 degrees. In some embodiments of the band saw 10, the inclination angle A of the last driven pulley 66c along the oblong path 64 of the saw blade 22 is oriented at an angle that matches a tilt angle of the saw blade 22 prior to passing through the cavity 46. In such an arrangement, the tilt angle of the saw blade 22 is unchanged between the last driven pulley 66c and the second guide roller set 114.

In operation of the band saw 10, the user depresses the switch assembly 30 positioned on the primary handle 28 to actuate the motor 21. The motor 21 outputs a torque through an output shaft (not shown) of the motor 21, in which the torque is transferred to the drive pulley 62 via the gear train and the drive pulley spindle. The drive pulley 62 is driven to rotate, causing the saw blade 22 to rotate and in turn, rotate the driven pulleys 66. As the saw blade 22 passes through the cavity 46, the user is allowed to complete a cutting operation.

Along the oblong path 64 of the saw blade 22, the driven pulleys 66 form a semi-circular path, in place of a single large-diameter driven pulley having the same size as the drive pulley 62, which permits the width of the cavity 46 to be increased compared to a traditional band saw 10 having a single large-diameter driven pulley having the same size as the drive pulley 62. Therefore, the increased width of the cavity 46 provides the user with more space to complete a cutting operation of a work piece.

To sustain the fatigue life of the saw blade 22, the distance over which the saw blade 22 is twisted should extend at an appropriate distance along the oblong path 64. By twisting the saw blade 22 to a desired tilt angle over an increased distance over the oblong path 64 leading to the cavity 46, the fatigue life of the saw blade 22 is increased compared to a traditional band saw 10, which requires the saw blade 22 to twist to a desired tilt angle over a shorter distance along the oblong path 64 (i.e., between the single large-diameter driven pulley and the second guide roller set 114).

Although the invention has been described in detail with reference to certain preferred embodiments, variations and modifications exist within the scope and spirit of one or more independent aspects of the invention as described.

What is claimed is:

1. A band saw comprising:
   a housing;
   a motor supported by the housing;
   a drive pulley configured to receive torque from the motor, causing the drive pulley to rotate;
   a plurality of driven pulleys rotatably coupled to a plate, the plate being coupled to the housing for sliding movement;
   a cavity within the housing and located between the drive pulley and the plurality of driven pulleys; and
   an endless saw blade wrapped around the drive pulley and the plurality of driven pulleys, the endless saw blade passing through the cavity and configured to be driven by the drive pulley, the saw blade defining an oblong path around the drive pulley and the driven pulleys;
   wherein a first of the driven pulleys is rotatable about a first axis oriented perpendicular to the plate, and
   wherein a second of the driven pulleys is rotatable about a second axis that is obliquely oriented relative to the plate to impart a twisting movement to the saw blade about the oblong path prior to the saw blade passing through the cavity,
   wherein the second axis defines a first inclination angle relative to a first normal extending from the plate and within a first common plane as the second axis,
   wherein the plurality of driven pulleys includes a third driven pulley rotatable about a third axis that is obliquely oriented relative to the plate, and
   wherein the third axis defines a second inclination angle relative to a second normal extending from the plate and within a second common plane as the third axis.

2. The band saw of claim 1, wherein the first inclination angle is 15 degrees.

3. The band saw of claim 2, wherein the second inclination angle is 30 degrees.

4. The band saw of claim 3, wherein the plurality of driven pulleys includes a fourth driven pulley rotatable about a fourth axis that is obliquely oriented relative to the plate, and wherein the fourth axis defines a third inclination angle of 45 degrees relative to a third normal extending from the plate and within a third common plane as the fourth axis.

5. The band saw of claim 1, wherein each driven pulley is rotatably coupled to the plate by a support shaft.

6. The band saw of claim 5,
   wherein a first of the support shafts supporting the first of the driven pulleys is oriented perpendicular to the plate.

7. The band saw of claim 6, wherein a second of the support shafts supporting the second of the driven pulleys is configured to be tilted such that the second axis defines the first inclination angle.

8. The band saw of claim 7, wherein a third of the support shafts supporting the third driven pulley is configured to be tilted such that the third axis defines the second inclination angle.

9. The band saw of claim 8, wherein a fourth of the support shafts supporting a fourth of the driven pulleys rotatable about a fourth axis that is obliquely oriented relative to the plate, and wherein the fourth support shaft is configured to be tilted such that the fourth axis defines a third inclination angle of 45 degrees relative to a third normal extending from the plate and within a third common plane as the fourth axis.

10. The band saw of claim 9, wherein the fourth driven pulley is proximate the cavity, and wherein the third inclination angle of the fourth axis matches a tilt angle of the endless saw blade prior to passing through the cavity.

11. The band saw of claim 6, wherein each support shaft is configured as a shoulder bolt including a first end, a second end opposite the first end, and a cylindrical shank disposed between the first end and the second end.

12. The band saw of claim 11, wherein each driven pulley is positioned along the cylindrical shank of each support shaft.

13. The band saw of claim 11, wherein the second end of each support shaft is configured to be received within a hole formed within the plate.

14. The band saw of claim 1, further comprising a tensioning assembly coupled between the plate and the housing, wherein the tensioning assembly is configured to move the plate in a first direction to increase tension in the blade and an opposite, second direction to decrease tension in the blade.

\* \* \* \* \*